United States Patent
Spieser

(10) Patent No.: US 9,178,775 B2
(45) Date of Patent: Nov. 3, 2015

(54) SYSTEM AND METHOD FOR PERFORMANCE MONITORING OF NETWORK SERVICES FOR VIRTUAL MACHINES

(71) Applicant: Alcatel-Lucent USA Inc., Murray Hill, NJ (US)

(72) Inventor: Frederic Spieser, Encino, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 131 days.

(21) Appl. No.: 14/145,591

(22) Filed: Dec. 31, 2013

(65) Prior Publication Data

US 2015/0188780 A1    Jul. 2, 2015

(51) Int. Cl.
*G01R 31/08* (2006.01)
*H04L 12/24* (2006.01)
*H04L 12/26* (2006.01)
*H04L 12/707* (2013.01)

(52) U.S. Cl.
CPC ........ *H04L 41/5009* (2013.01); *H04L 41/5019* (2013.01); *H04L 43/12* (2013.01); *H04L 45/22* (2013.01)

(58) Field of Classification Search
USPC .......................................................... 709/223
See application file for complete search history.

(56) References Cited

U.S. PATENT DOCUMENTS

| 8,140,682 | B2 * | 3/2012 | Murthy et al. ................. 709/226 |
| 2007/0263541 | A1 * | 11/2007 | Cobb et al. ..................... 370/235 |
| 2008/0046266 | A1 * | 2/2008 | Gudipalley et al. ................ 705/1 |
| 2015/0039764 | A1 * | 2/2015 | Beloglazov et al. .......... 709/226 |
| 2015/0095445 | A1 * | 4/2015 | Thankappan et al. ........ 709/214 |

* cited by examiner

*Primary Examiner* — Duc C Ho
(74) *Attorney, Agent, or Firm* — Loza & Loza, LLP

(57) ABSTRACT

An edge network element of a provider network, such as in a data center, determines one or more service level parameters and service probes defined for a local virtual machine connected to the edge network element. The edge network element generates at least one service probe to measure the one or more service level parameters over a network path to a remote edge network element that is associated with a remote virtual machine having a same service instance identifier ISID or virtual machine profile as the local virtual machine. The edge network element generates a notification to a network management system including the measured one or more service level parameters of the network path and media access control (MAC) addresses of the edge network element, the remote edge network element, the local virtual machine and the remote virtual machine.

20 Claims, 8 Drawing Sheets

SAA Module 120a

| SAA1 122 | SAA2 122 | SAA3 122 |
|---|---|---|

SAA Log 400 for Local Edge NE 112 B-MAC1

| SAA 122 | ISID 118 | vNP 114 | Local VM 112 | Remote Edge NE 114 | Remote VM 112 | SLA Parameters 402 |
|---|---|---|---|---|---|---|
| SAA1 | ISID1 | vNP1 | C-MAC1 | B-MAC2 | C-MAC3 | Iteration1, 2, etc. 406 |
| SAA2 | ISID1 | vNP1 | C-MAC1 | B-MAC3 | C-Mac4 | Iteration1, 2, etc. 406 |
| SAA3 | ISID2 | vNP2 | C-MAC2 | B-MAC3 | C-Mac5 | Time Period 408 |

Memory 404

Fig. 4a

SAA Module 120b

| SAA4 122 | SAA5 122 |
|---|---|

SAA Log 400 for Local Edge NE 114 B-MAC2

| SAA 122 | ISID 118 | vNP 114 | Local VM 112 | Remote Edge NE 114 | Remote VM 112 | SLA Parameters 402 |
|---|---|---|---|---|---|---|
| SAA5 | ISID1 | vNP1 | C-MAC3 | B-MAC1 | C-MAC1 | Iteration1, 2, etc. |
| SAA6 | ISID1 | vNP1 | C-MAC3 | B-MAC3 | C-MAC4 | Iteration1, 2, etc. |
|  |  |  |  |  |  |  |

Memory 404

| NMS Destination Address 410 | Source Address 412 | VLAN ID 414 | SAA ID 414 | Local VM MAC 416 | Remote Edge NE MAC 418 | Remote VM MAC 420 | ISID 420 | SLA Parameters 422a | SLA Parameters 422b | ••• | SLA Parameters 422n |
|---|---|---|---|---|---|---|---|---|---|---|---|

Fig. 4c

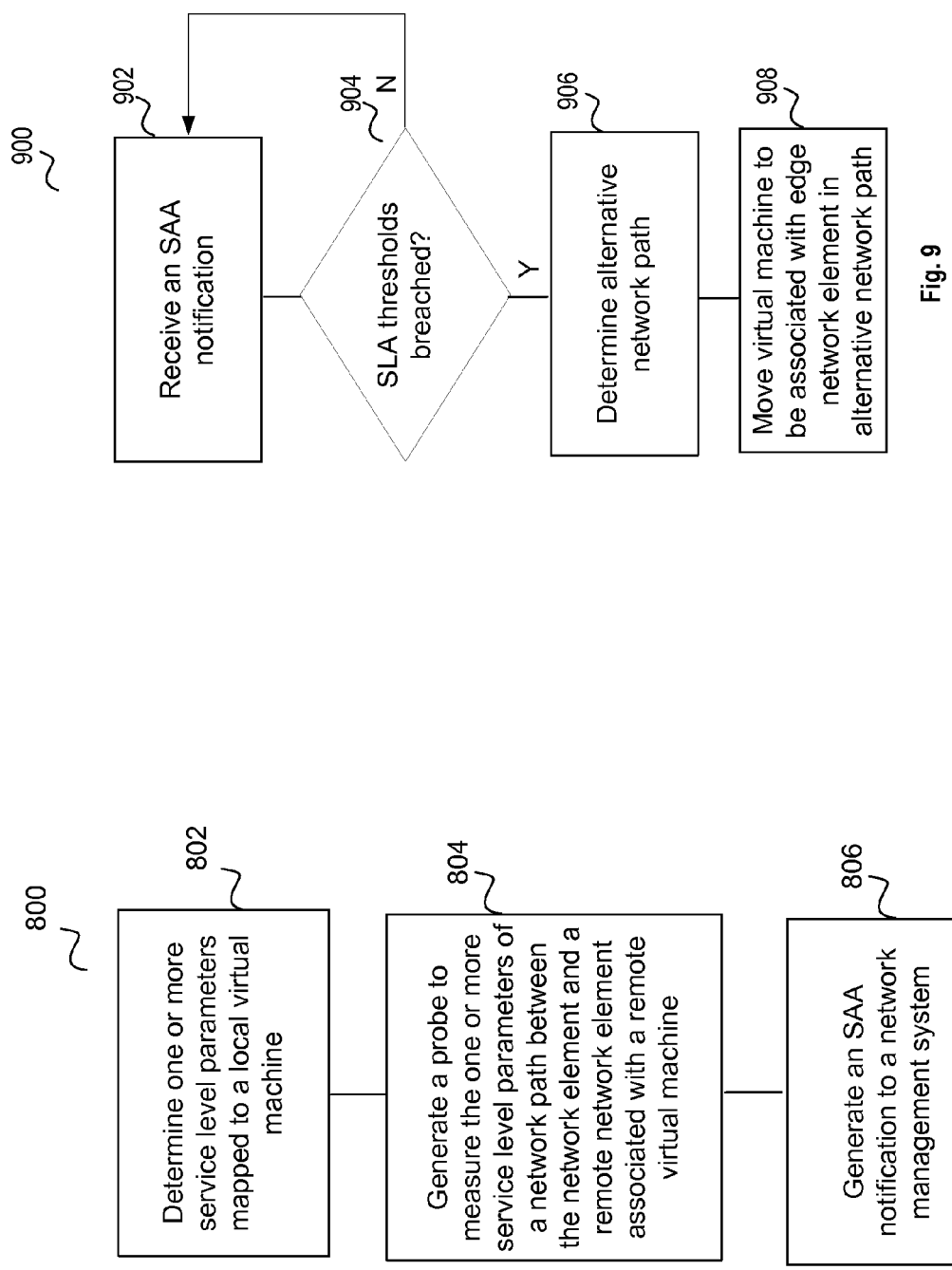

SYSTEM AND METHOD FOR PERFORMANCE MONITORING OF NETWORK SERVICES FOR VIRTUAL MACHINES

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to communications and in particular to systems and methods for monitoring traffic in a communications system.

2. Description of Related Art

This section describes related art, and accordingly, the statements in this section are not admissions of prior art.

Data networks, such as cloud networks, data center networks, etc., are able to support multiple customers and applications. Such data networks include interconnected network devices, such as bridges, switches or routers, for transporting various types of traffic, such as voice, data and video traffic, through the data network.

Virtualization enables a host platform or server to be partitioned into virtual machines. A virtual machine may have its own allocated operating system, applications and network interfaces on the host platform. A data network may provide network services to transport traffic between virtual machines and to other networks or destinations. Virtual machines are typically connected to the data network by edge nodes. Selection of the edge nodes for connecting virtual machines to the data network may be initially based on considerations of quality of service and network performance metrics. However, in addition, measurement of actual network performance of the network paths between edge nodes interconnecting virtual machines to the data network is needed to help determine compliance with service level agreements.

BRIEF DESCRIPTION OF THE DRAWINGS

Some embodiments of apparatus and/or methods are now described, by way of example only, and with reference to the accompanying drawings, in which:

FIG. 4a illustrates a schematic block diagram of an embodiment of an SAA module;

FIG. 4b illustrates a schematic block diagram of another embodiment of an SAA module;

FIG. 4c illustrates a schematic block diagram of an embodiment of an SAA notification;

FIG. 8 illustrates a logical flow diagram of an embodiment of operation of an edge network element; and FIG. 9 illustrates a logical flow diagram of an embodiment of a method of operation of a network management system.

DETAILED DESCRIPTION OF ILLUSTRATIVE EMBODIMENTS

Figure 1:
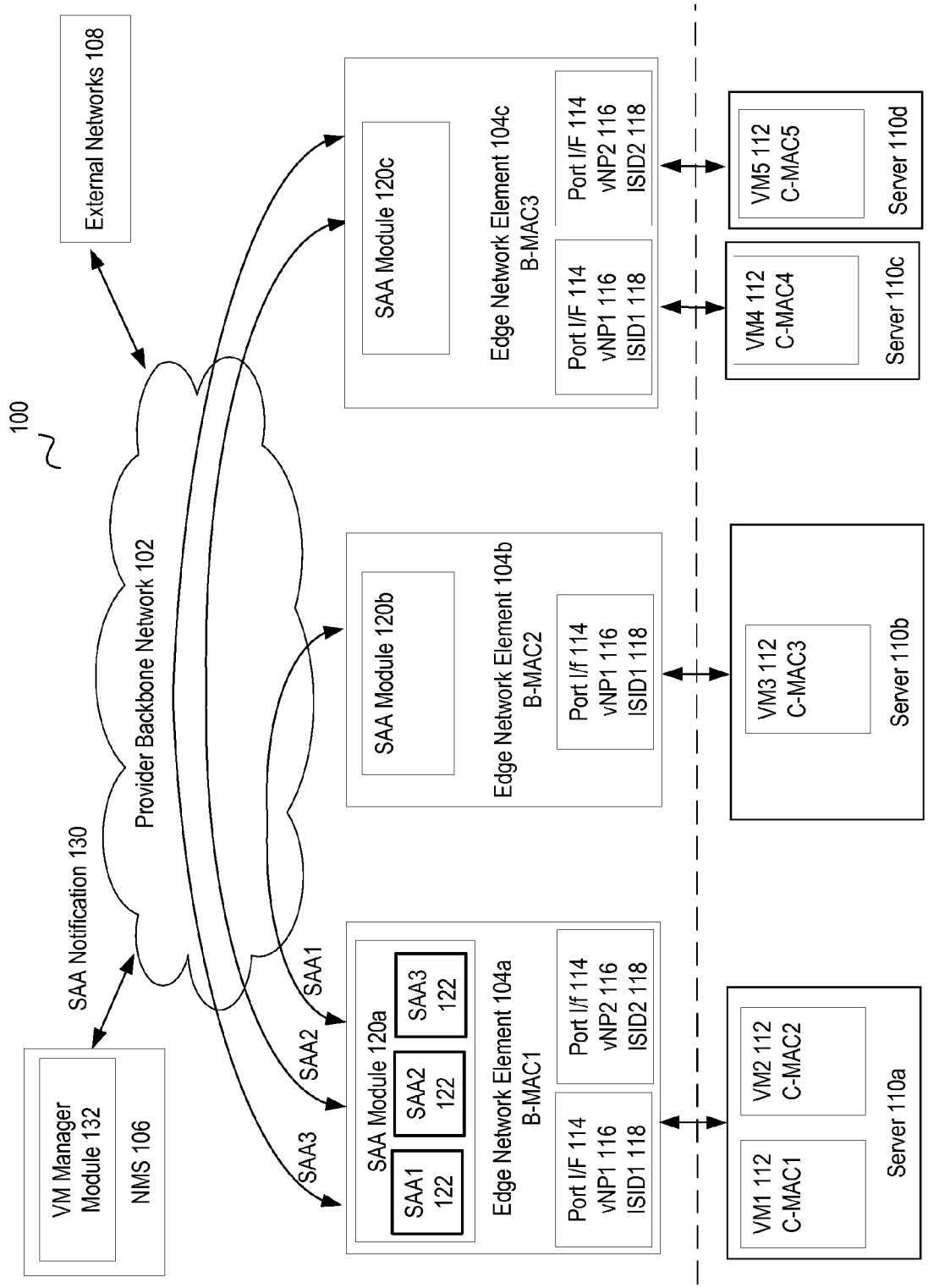
FIG. 1 illustrates a schematic block diagram of an embodiment of a provider network operable to provide network services between virtual machines.

FIG. 1 illustrates a schematic block diagram of an embodiment of a provider network 100 operable to provide network services between virtual machines. The provider network 100 may function as a data center network, cloud network, enterprise network, etc. The provider network 100 includes a provider backbone network 102 and a plurality of edge network elements 104. In an embodiment, the edge network elements 114 are backbone edge bridges (BEB) though other types of edge and/or aggregate devices operable to couple servers or other types of host platforms to a provider backbone network 102 may be implemented as well. The provider backbone network 102 includes a plurality of devices, such as bridges, switches and routers, operable to provide transport services between edge network elements 104, a network management system (NMS) 106 and one or more external networks 107. For example, external networks 107 may include additional provider backbone networks, customer networks, wide area networks (such as the Internet) or other types of networks.

Edge network elements 104 are operably coupled to one or more servers 110. The servers 110 may be incorporated and managed as part of the provider network 100 or may be included in one or more other networks managed separately from the provider network 100, such as customer or client networks, including third party enterprise or local area networks or data center networks. The servers 110 include a virtualization layer of resources wherein the server resources are partitioned into one or more virtual machines 112. The virtualization layer operates on the servers 110 to abstract processor, memory, storage and networking resources and to provision the resources to multiple virtual machines 112. A virtual machine 112 shares the hardware resources of its host server 110 (and in an embodiment, resources of other servers 110) but is a separate logical entity supporting, e.g., its own operating system, applications and/or network interfaces.

In an embodiment, the virtual machines 112 are assigned a layer 2 address, e.g., a media access control (MAC) address. For example, in an embodiment shown in FIG. 1, in server 110a, virtual machine 1 (VM1) 112 has an assigned MAC address of C-MAC1 and virtual machine 2 (VM2) 112 has an assigned MAC address of C-MAC2. Server 110b includes virtual machine 3 (VM3) 112 having an assigned MAC address of C-MAC3. Server 110c includes virtual machine 4 (VM4) 112 having an assigned MAC address of C-MAC4 while server 110d includes virtual machine 5 (VMS) 112 with an assigned C-MAC 5. Each of the servers 110 are operatively coupled to at least one edge network element 104 of the provider network 100, e.g. over one or more user to network interface (UNI) ports.

The edge network elements 104 receive traffic from the virtual machines 112 through one or more port interfaces (Port I/F) 114 (e.g., a UNI port). The port interfaces 114 may include one or more ports, a plurality of ports configured as a link aggregate group (LAG) or one or more ports configured as a virtual port or other type of service access points (SAPs). The port interfaces 114 of an edge network element 104 may be incorporated in one network interface card or module or may be distributed in a plurality of network interface cards or modules.

For each associated virtual machine 112 (e.g., virtual machines included in servers 110 coupled to the edge network element 104 over a UNI port) having a unique MAC address, the edge network elements 104 assign or associate the virtual machine 112 with a Virtual Network Profile (vNP) 116. A vNP 116 is configured specifically for machine classification, especially virtual machines. The virtual machines 112 are bound to a vNP 116 to ensure consistent application of network access controls and quality of service (QoS) policies. The vNPs 116 are configured on the edge network elements 104 to facilitate discovery of virtual machines 112 and for mobility of virtual machines 112 within the provider network 100. The vNPs 116 specify transport services (such as shortest path bridging or SPB services described in more detail herein) that span the provider network 100. When a VM 112 is discovered by an edge network element 104 or migrates to a new edge network element 104 in the provider network 100, the assigned vNP 116 applies access controls and QoS policies defined in the vNP 116 to the VM 112. Once a VM 112 is assigned to a vNP 116, the VM traffic is bound to the virtual local area network (VLAN) or service defined in the vNP 116. In addition, QoS policies associated with the vNP 116 are also applied to the VM traffic.

The vNPs 114 define a service type using a service instance identifier (ISID) 118. The ISID 118 indicates a given transport service through the provider network 100. For example, the ISID 118 indicates the authorized paths, such as equal cost multi-trees, spanning trees, VLANs, etc., defined for that service. Thus, traffic from the port interfaces 114 with an ISID equal to ISID1 are assigned to transport services defined for ISID1. Traffic from port interfaces 114 with an ISID equal to ISID2 are assigned transport services defined for ISID2. When a service is configured in the form of an ISID assignment that ISID is then advertised to other edge network elements 104 and to the plurality of devices in the provider backbone network 102.

In an embodiment, vNPs 114 also include service assurance agent (SAA) probe definitions and service level agreement (SLA) definitions. The SLA definition includes network performance parameters such as packet loss threshold, packet latency thresholds (e.g., average, minimum, maximum packet latency, round trip time, etc.), packet jitter thresholds (e.g., average, minimum and maximum packet jitter), etc. The SAA probe definitions include probe parameters such as packet size, number of packets, inter packet delay, frequency of probe execution or iteration, etc. In another embodiment, ISID or service profiles include the service assurance agent (SAA) probe definitions and service level agreement (SLA) definitions.

The network elements 104 include a service assurance agent (SAA) module 120. The SAA module 120 is operable to determine the service assurance agent (SAA) probe definitions and service level agreement (SLA) definitions associated with the one or more virtual machines 112 associated with the edge network element 104. The SAA module determines, e.g., the service assurance agent (SAA) probe definitions and service level agreement (SLA) definitions associated with the one or more virtual machines 112 from the virtual machine profile vNP 116 associated with the virtual machine or from the ISID or service profile associated with the virtual machine 112.

The SAA module 120 is operable to generate an SAA probe for each local virtual machine VM 112 associated with the edge network element 104 to measure one or more service level parameters of a network path between the edge network element 104 and a remote edge network element associated with a remote virtual machine 112 having a same ISID or same vNP. For example, SAA module 120a determines that VM3 112 associated with edge network element 104b has an assigned same vNP1 and/or same ISID1. SAA module 120a then generates a first SAA probe SAA1 122 between network element 104a and network element 104b. The SAA probe operates in accordance with the SAA probe definitions (e.g., packet size, number of packets, inter packet delay, frequency of probe execution or iteration) to measure the SLA parameters defined in the SLA definition.

In an embodiment, SAA module 120a is operable to measure one or more service level parameters of the network path between the edge network element 104a and a remote edge network element 104b. The SAA module stores the measured service level parameters along with a layer 2 address, such as a media access control (MAC) address, of the remote network element 104 and MAC address of the remote virtual machine 112 associated with the remote network element 104. The SAA module may also store the same associated ISID 118 and/or vNP 116 of the local virtual machine and remote virtual machine. For example, for SAA probe SAA1 122, the SAA module 120a stores the measured one or more service level parameters with the MAC address B-MAC1 of the local edge network element, MAC address B-MAC2 of the remote network element 104b and the MAC address of C-MAC3 of the remote virtual machine VM3 associated with the remote network element 104b. The shared ISID 118 equal to ISID1 and/or shared virtual network profile 116 equal to vNP1 of the local virtual machine VM1 112 and remote virtual machine VM3 112 may also be stored with the determined service level parameters.

The SAA module 120a is further operable to generate additional SAA probes for local virtual machines 112 to measure one or more service level parameters of other network paths between the local edge network element and remote edge network elements associated with other remote virtual machines 112 having a same ISID or same vNP. For example, SAA module 120a determines that VM4 112 associated with edge network element 104c has an assigned same virtual network profile vNP1 116 and/or same ISID1 118. SAA module 120a then generates a second SAA probe SAA2 122 between network element 104a and network element 104c. The SAA probes 122 operate in accordance with their associated SAA probe definitions (e.g., packet size, number of packets, inter-packet delay, frequency of probe executions or iterations).

In an embodiment, SAA module 120a continues to generate SAA probes 122 for each other network path between local edge network element 104a associated with local virtual machine VM1 (e.g., virtual machines 112 included in servers 110 coupled to the local edge network element 104, e.g. such as over a UNI port) and each other remote edge network element 104 associated with a remote virtual machine 112 having a same ISID or same virtual profile identifier vNP 116 as the local virtual machine VM1. The SAA module 120a stores the measured service level parameters along with the MAC address of the local virtual machine 112, the MAC address of the local network element 104, the MAC address of the remote network element 104 and the MAC address of the remote virtual machine 112.

The SAA module 120a is further operable to generate an SAA probe 122 for other local virtual machines 112 associated with the edge network element 104a, such as VM2 112. Since VM2 112 has an ISID 118 equal to ISID2 and a virtual network profile 116 of vNP2, SAA module 120a determines any remote edge network elements 104 associated with a remote virtual machine 112 having an ISID equal to ISID2 and/or a virtual network profile of vNP2. SAA module 120a then generates an SAA probe 122 to measure one or more service level parameters of network paths between the edge network element 104a and the determined remote edge network elements 104 associated with a remote virtual machine 112 having an ISID equal to ISID2 and/or a virtual network profile of vNP2. In the example of FIG. 1, SAA module 120a initiates probe SAA3 122 between local edge network element 104a and remote network element 104c associated with virtual machine VM5 112 having an ISID 118 of ISID2 and a virtual network profile 116 of vNP2.

Thus, in an embodiment, the SAA module 120a generates for each local virtual machine (such as VM1 and VM2) associated with the local edge network element 104a, an SAA probe 122 between the local edge network element 104a and each remote edge network element (such as network elements 104b and 104c) with an associated remote virtual machine 122 having a same ISID and/or same vNP (such as between VM1 and VM3 and between VM1 and VM4 and between VM2 and VM5). Using this principle, SAA module 120a generates SAA1 122, SAA2 122 and SAA3 122 as shown in FIG. 1.

The SAA module 120 processes the measured service level parameters from the SAA probes 122 and transmits a SAA notification 130 to the network management system (NMS) 106. The SAA notification 130 may include a history of the SAA probes 122 for a specified period of time or number of iterations. Alternatively or in addition thereto, the SAA notification may include a notice that one or more service level parameters in one or more iterations of one or more SAA probes 122 breaches, e.g. exceeds or fails to meet, a predetermined threshold. In addition, the SAA notification for an SAA probe 122 includes the MAC address of the local edge network element 104 and remote edge network element 104 of the measured network path. The SAA notification for an SAA probe 122 may also include the MAC address of the local virtual machine 112 and remote virtual machine 122.

In an embodiment, a virtual machine (VM) manager module 132 of the NMS 106 receives and processes the SAA notifications 130. The VM manager module 132 and its functions described herein may be included as part of the NMS 106 or may be a separate network management module or system from the NMS 106. The VM manager module 132 processes the SAA notifications 130 and may determine to relocate a virtual machine 112 in response thereto. For example, the VM manager module 132 may determine from the measured service level parameters in an SAA notification 130, that the network path between a local and remote virtual machine has not met required SLA thresholds. The VM manager module 132 may then decide to move one of the virtual machines 112 to another server 110. Preferably, the VM manager module 132 identifies a network path between virtual machines 112 having a same ISID 118 or vNP 116 that has historically demonstrated required performance levels and moves one of the virtual machines 112 to an edge network element 104 in that network path.

For example, in an embodiment VM manager module 132 receives an SAA notification 130 including measured service level parameters from probe SAA2 of the network path between local edge network element 104a associated with local virtual machine VM1 112 and remote edge network element 104c associated with remote virtual machine VM4 112. When the measured service level parameters of the network path breach or fail to meet required SLA thresholds, VM manager module 132 may then determine to move VM1 or VM4. In this example, the VM manager module 132 determines to move VM4. It then tries to determine a network path meeting SLA thresholds having a same service or same ISID1 as VM4. The VM manager module 132 based on SAA notifications from probe SAA1 122, may determine that the network path between local edge network element 104a associated with local virtual machine VM1 112 and remote edge network element 104b associated with remote virtual machine VM3 112 having a same ISID1 118 is a good candidate. The VM manager module 132 then moves virtual machine VM4 to this network path. The VM manager module 132 may select server 110a or 110b of this network path depending on load, capacity, resources, etc. of the respective servers 110a and 110b.

Figure 2:
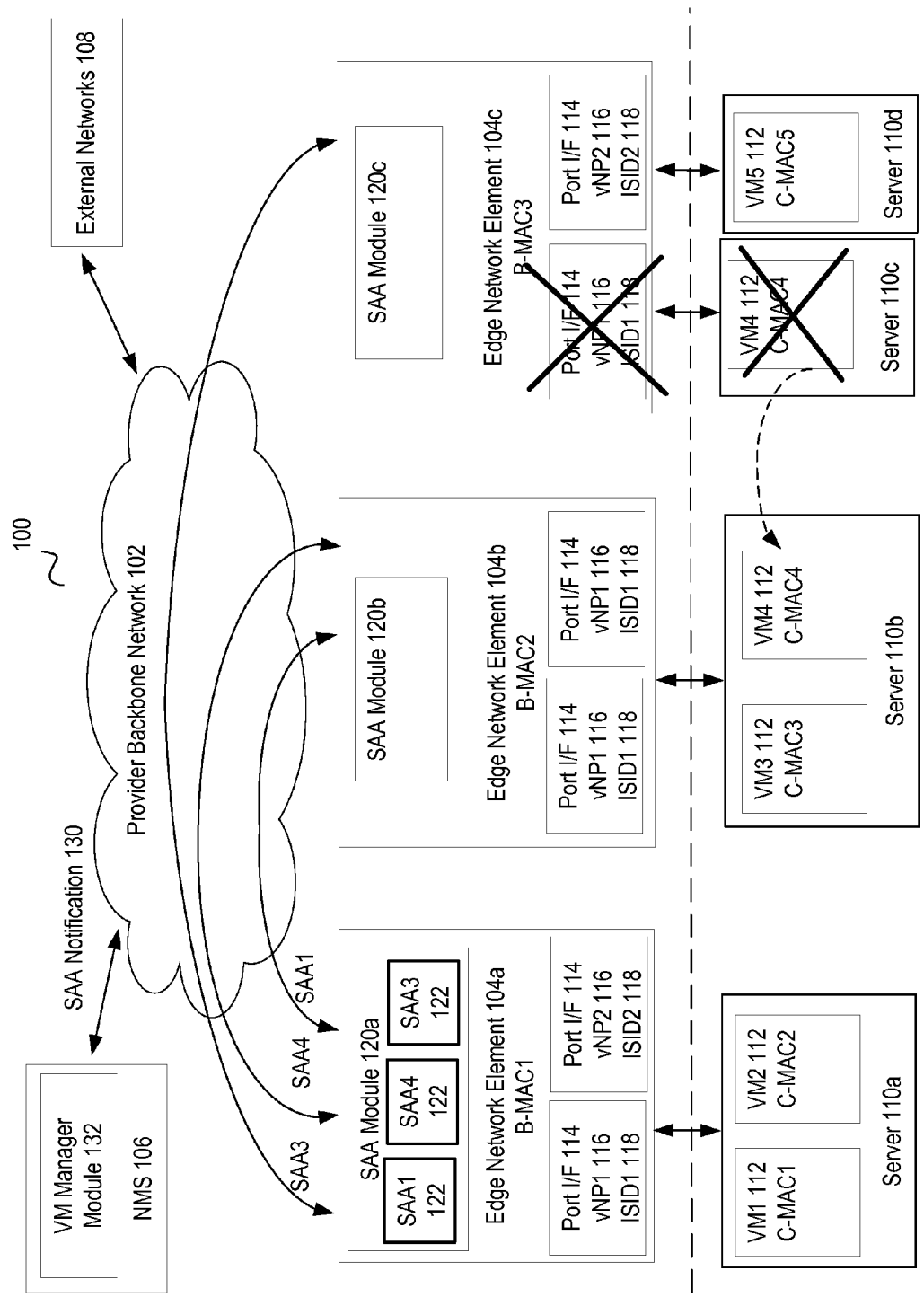
FIG. 2 illustrates a schematic block diagram of an embodiment of a provider network after movement of a virtual machine based on performance monitoring.

FIG. 2 illustrates a schematic block diagram of an embodiment of provider network 100 after movement of a virtual machine based on performance monitoring. As in the example explained herein, the VM manager module 132 based on SAA notifications from probe SAA1, determines that the network path between local edge network element 104a associated with local virtual machine VM1 112 and remote edge network element 104b associated with remote virtual machine VM3 112 having a same ISID1 as VM4 is a good candidate. In this example, the VM manager module 132 then moves virtual machine VM4 to server 110b.

When edge network element 104b detects packets from VM4 112, e.g. with a source MAC address equal to C-MAC4, it determines the ISID 118 and vNP 116 associated with VM4 112. Edge network element 104b then configures port interface 114 to handle the traffic from VM4 in compliance with the determined ISID1 and vNP1. Furthermore, when edge network element 104a detects virtual machine VM4 associated with network element 104b having a same ISID 118 and/or vNP 116 as local virtual machine VM1, edge network element generates a new probe SAA4 122. The new probe SAA4 122 monitors the network path between local edge network 104a associated with local virtual machine VM1 112 and remote edge network element 104b now associated with remote virtual machine VM4 122 having a same ISID1 118.

Though FIGS. 1 and 2 illustrate the SAA probes 122 generated by SAA module 120a in network element 104a, SAA modules in other edge network elements 104 also generate SAA probes 122. In an embodiment, the SAA modules 120 in each of the edge network elements 104 generates for each local virtual machine, an SAA probe 122 between the local edge network element 104 and each remote edge network element 104 with an associated virtual machine having a same ISID 118 and/or same vNP 116.

Figure 3:
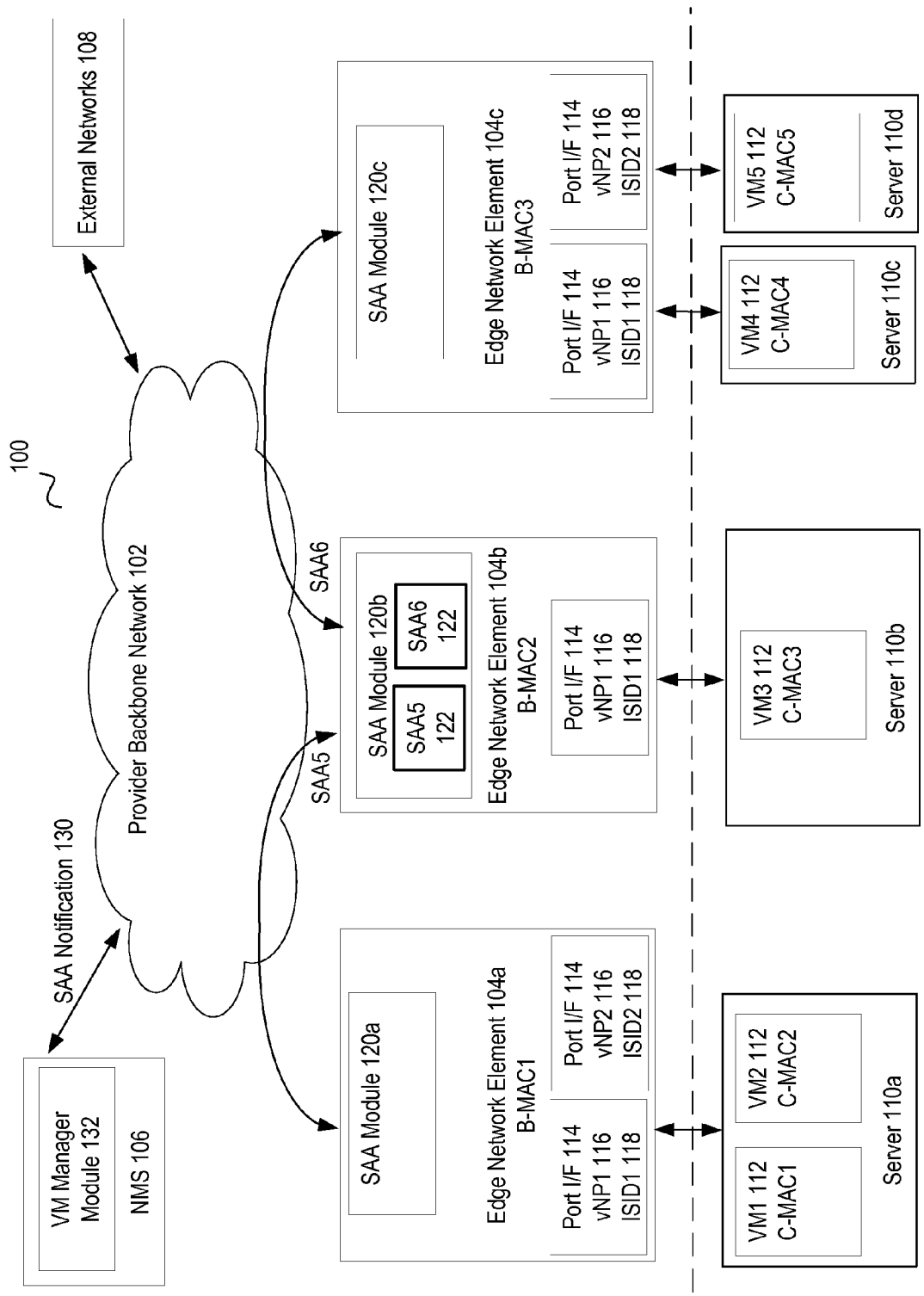
FIG. 3 illustrates a schematic block diagram of another embodiment of provider network providing network services between virtual machines.

FIG. 3 illustrates a schematic block diagram of another embodiment of provider network 100 providing network services between virtual machines 112. In this figure, SAA probes 122 generated by edge network element 104b are illustrated. SAA module 120b detects that a virtual machine VM3 112 assigned an ISID1 118 and vNP1 116 is operably connected to network element 104b (e.g., over a UNI port). SAA module 120b then determines other remote edge network elements 104 associated with virtual machines having a same assigned ISID1 and/or vNP1 as local virtual machine VM3. When SAA module 120*b* determines that remote network element 104*a* is associated with a remote virtual machine VM1 112 with a same ISID1 and/or vNP1 as local virtual machine VM3 112, it generates an SAA probe SAA5 112. Similarly, when SAA module 12*b* determines that remote network element 104*c* is associated with a remote virtual machine VM4 112 with a same ISID1 118 and/or vNP1 116 as local virtual machine VM3 112, it generates an SAA probe 122 SAA6. Thus, the SAA modules 120 in each of the edge network elements generates for each local virtual machine associated with the local edge network element 104, an SAA probe 122 between the local edge network element 104 and each remote edge network element 104 with an associated remote virtual machine having a same ISID 118 and/or same vNP 116 as the local virtual machine 112.

In an embodiment, the SAA module 120 uses the ISID 118 of the local virtual machine to determine remote virtual machines 112 for generation of SAA probes 122. In another embodiment, the SAA module 120 uses the vNP 116 of the local virtual machine 112 to determine remote virtual machines 112 for generation of SAA probes 122. In some instances, the ISID 118 is unique to a virtual network profile, vNP 116, e.g. the vNP 116 may be identified by the ISID 118. In this case, either the vNP 116 or ISID 118 or both may be used by the SAA module 120 to determine remote virtual machines 112 for generation of SAA probes 122.

FIGS. 4*a* and 4*b* illustrate a schematic block diagram of embodiments of SAA modules 120. FIG. 4*a* illustrates an example of SAA module 120*a* of edge network element 104*a*, e.g. as shown in FIG. 1. The SAA module 120*a* includes at least one memory 404 operable to store an SAA log 400. The SAA log 400 stores a MAC address of local edge network 104*a* (such as B-MAC1 address), and the SAA probes 122 associated with local virtual machines 112 of the local edge network 104*a* along with the ISID 118 and/or vNP 116 of the local virtual machines 112. For example, SAA probe SAA1 122 and SAA2 122 are associated with MAC address of C-MAC1 of local virtual machine VM1 112 and service instance identifier ISID1 118, and SAA3 122 is associated with MAC address of C-MAC2 of local virtual machine VM2 112 and service instance identifier ISID2 118. In addition, the SAA log 400 stores the MAC address of the associated remote edge network element 114 and MAC address of the remote virtual machine 112 with the measured SLA parameters 402.

The measured SLA parameters 402 include measured SLA parameters from one or more iterations 406 or measured SLA parameters over one or more predetermined time periods 408. The measured SLA parameters stored in the SLA log 400 may also include SLA parameters that have breached (e.g., exceeded or failed to meet) thresholds for one or more iterations 406 or predetermined time periods 408. The SLA parameters may also include results of any layer 2 probes performed by the SAA modules 120 to determine network paths between the local edge network element 104 and a remote edge network element 104. For example, a layer 2 probe may be launched to determine a network path for a particular ISID 118 between the local edge network element 104 and a remote edge network element 104.

FIG. 4*b* illustrates an example of SAA module 120*b* of edge network element 104*a*, e.g. as shown in FIG. 3. The SAA module 120*b* includes at least one memory 404 operable to store an SAA log 400. The SAA log 400 of SAA module 120*b* stores a MAC address (such as B-MAC address) of local edge network 104*b*, and the SAA probes 122 associated with local virtual machines 112 of the local edge network 104*b* along with the ISID 118 and/or vNP 116 of the local virtual machines 112. For example, SAA probe SAA5 and SAA6 are associated with MAC address of C-MAC1 of local virtual machine VM3 112 and service instance identifier ISID1 118. For probe SAA5, the SAA log 400 stores the MAC address of the associated remote edge network element 104*a* (B-MAC1) and MAC address of the remote virtual machine 112 (C-MAC1) having a same service identification ISID1 as the local virtual machine VM3. The SAA log 400 stores the measured SLA parameters 402 for the SAA probe SAA5 as well. For probe SAA6, the SAA log 400 stores the MAC address of the associated remote edge network element 104*b* (B-MAC3) and MAC address of the associated remote virtual machine 112 (C-MAC5) having a same service identification ISID1 118 as the local virtual machine VM3. The SAA log 400 stores the measured SLA parameters 402 for the SAA probe SAA6 as well. The SLA parameters may also include results of any layer 2 probes performed by the SAA modules 120 to determine network paths between the local edge network element 104 and a remote edge network element 104. For example, a layer 2 probe may be launched to determine a network path for a particular ISID 118 between the local edge network element 104 and a remote edge network element 104.

An SLA module 120 is thus able to generate an SAA probe 122 between a local edge network element 104 associated with at least one local virtual machine 112 and a remote edge network element 104 associated with at least another remote virtual machine 112. In particular, an SAA probe 122 measures SLA parameters for a network path between two edge network elements 104 each associated with one or more virtual machines 112 with a same service instance identifier, such as an ISID 118, and/or a same virtual machine profile vNP 116. The SLA modules stores the measured SLA parameters in an SAA log 400 and provides SAA notifications 130 to VM manager module 132.

FIG. 4*c* illustrates a schematic block diagram of an embodiment of an SAA notification 130. SAA module 120 generates an SAA notification 130 using at least in part information from SAA log 400. The SAA notification 130 may be a layer 2 or layer 3 type packet or frame. In an embodiment, SAA notification 130 includes a destination address field 410 including an address for NMS 106 or for virtual manager module 132. SAA notification 130 further includes a source address field 412 including an address (such as the MAC address) of the local edge network element 104 transmitting the SAA notification 1300. If the source address field includes an IP address or other address not clearly identifying the MAC address of the local edge network element 104, another field may be included in the SAA notification to identify the MAC address of the local edge network element 104. The SAA notification 130 may further include a VLAN ID field 414 that identifies a management or control VLAN for the provider network 100.

In a payload or header portion of SAA notification 130, SAA notification 130 includes fields to identify the SAA probe 122 and the network path measured by the SAA probe 122. For example, SAA notification 130 includes an SAA identifier field 414 that includes an identifier of the SAA probe (such as SAA1 or SAA2). The SAA notification 130 includes local virtual machine MAC address field 416, remote edge network element MAC address field 418 and remote virtual machine MAC address field 418 for the network path measured by the identified SAA probe 122. ISID field 420 including the ISID 118 of the local and virtual machines may be included as well.

SAA notification 130 further includes one or more SLA parameter fields 422 in a payload or other portion of the packet. In an embodiment, SLA parameter field 422a includes measured SLA parameters for a first iteration of SAA probe 122 while SLA parameter field 422b includes measured parameters for a second iteration of SAA probe 122, etc. In another embodiment, SLA parameter fields 422a-n include measured parameters over a predetermined period of time. In another embodiment, SLA parameter fields 422a-n include SLA thresholds breached over a period of time or over one or more iterations. In another embodiment, SLA parameter fields 422a-n include results of a layer 2 probe identifying network devices in the network path between the local edge network element 104 and the remote edge network element 104 of the SAA probe 122.

Figure 5:
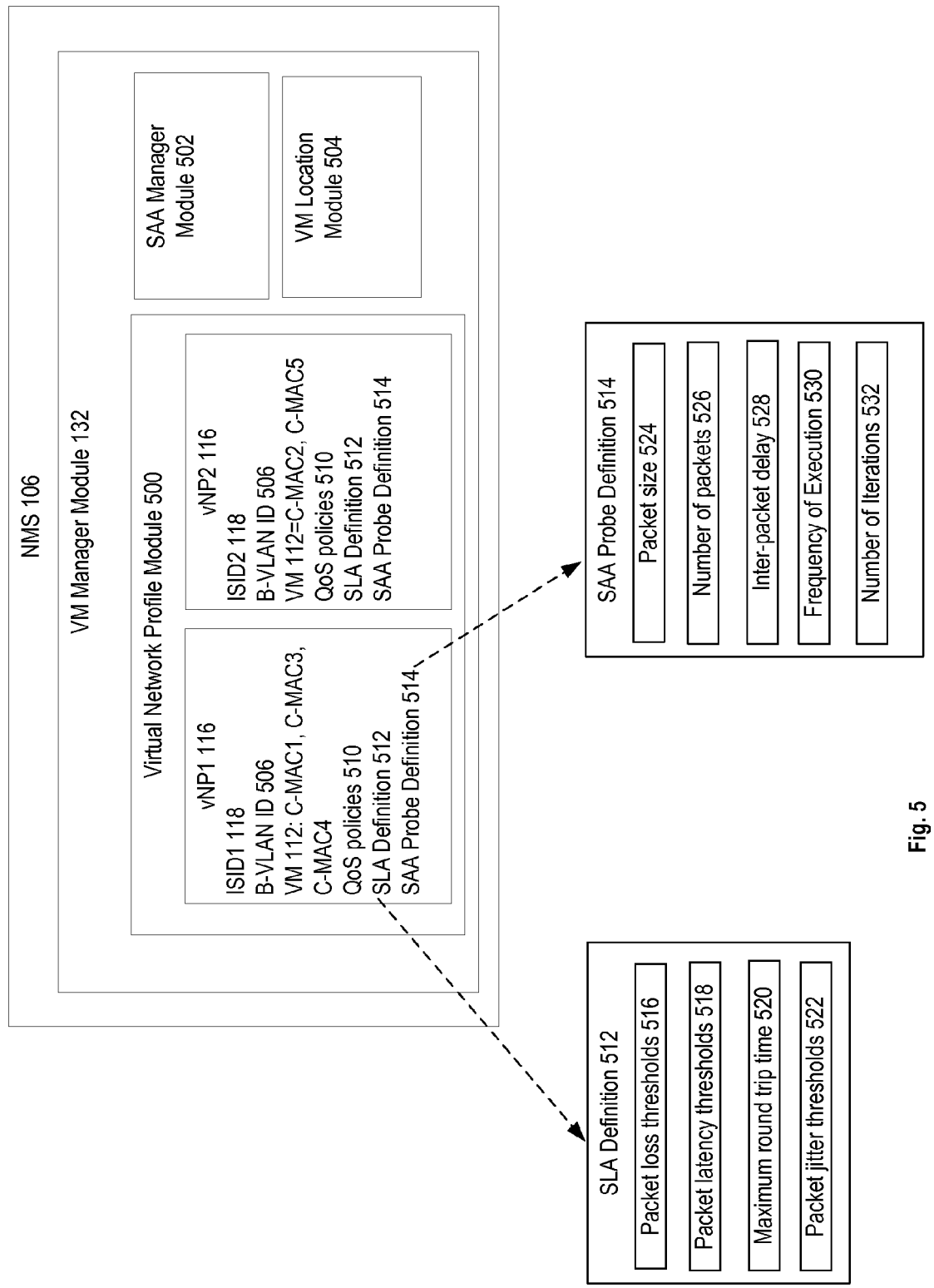
FIG. 5 illustrates a schematic block diagram of an embodiment of a network management system.

FIG. 5 illustrates a schematic block diagram of an embodiment of network management system (NMS) 106 of network 100. In an embodiment, VM manager module 132 and functions described thereof are included in the NMS 106. In another embodiment, the VM manager module 132 and/or one or more functions described thereof may be included in one or more other management systems or modules of network 100, including distributed in one or more element managers of edge network elements 104 or other types of devices in provider network 100.

The VM manager module 132 includes virtual network profile module 500, SAA manager module 502 and VM location module 504. Virtual network profile module 500 includes a plurality of virtual network profiles (vNP) 116. A virtual network profile 116 is associated with a service attachment identification (ISID) 118. ISID 118 indicates a given transport service through the provider network 100. For example, ISID 118 indicates the authorized paths, such as equal cost multi-trees, spanning trees, VLANs, etc., defined for that service. When a VM 112 is configured with a vNP 116, the ISID 118 associated with the vNP and MAC address of the VM configured with the vNP 116 is advertised to other edge network elements 104.

In an embodiment, a virtual network profile 116 also includes a provider VLAN (B-VLAN) identification 506. The B-VLAN indicates a VLAN in the provider network 100 authorized for traffic from VMs 112 associated with the virtual network profile 116. The virtual network profile 116 also includes one or more identifications of virtual machines (VM) 112 configured or associated with the virtual network profile 116. The identification may include MAC addresses of the VMs 112 or other type of identifications. For example, from FIG. 1, vNP1 116 is associated with virtual machines 112 having a MAC address of C-MAC1, C-MAC2 and C-MAC3, and vNP2 116 is associated with virtual machines 112 having a MAC address of C-MAC2 and C-MAC5.

In an embodiment, virtual network profile 116 also defines quality of service (QoS) policies 510 for managing traffic originating from virtual machines 112 associated with the vNP 116. In an embodiment, the QoS policies 510 include queue parameters (such as priority queueing), traffic shaping, bandwidth usage, admission control, scheduling parameters, traffic priorities, etc.

In an embodiment, virtual network profile 116 defines service level agreement (SLA) parameters in SLA definition 512 and service assurance agent (SAA) probe parameters in SAA probe definition 514 for virtual machines 112 associated with the vNP 116. An example of SLA parameters in SLA definition 512 includes, e.g., packet loss thresholds 516, packet latency thresholds 518 (such as average, minimum, maximum packet latentcy), maximum round trip time 520, packet jitter thresholds 522 (such as average, minimum, maximum packet jitter), etc. SLA definition 512 may include one or more of these SLA parameters or additional or alternative SLA parameters. SAA probe definition 514 includes various probe parameters describing how and when SLA parameters are measured. SAA probe definition includes probe parameters, e.g., packet size 524, number of packets 526, inter-packet delay 528, frequency of execution of probes 530, number of iterations of probes 532, etc. SAA probe definition 514 may include one or more of these SAA probe parameters or additional or alternative SAA probe parameters.

The virtual network profiles 116 enable a network administrator the flexibility to control and affect network behavior or SLA changes over a range of virtual machines 112 in the network 100. The network administrator by modifying one or more parameters in a virtual network profile 116 has the ability to reconfigure parameters across multiple virtual machines 112 which share the same virtual network profile 116. This centralized control of virtual machine 112 configurations provides advantages to network management especially with large network deployments. Managing the virtual network profile 116 for a group of virtual machines 112 sharing the same profile simplifies the configuration and reduces the possibility of misconfiguring any one virtual machine.

The VM manager module 132 also includes SAA manager module 502 and VM location module 504. VM location module 504 enables migration of virtual machines from one server 110 to another server 100. VM location module 504 also configures and provisions the virtual machines once located at a server 110. The VM location module 504 updates virtual machine 112 locations and tracks location of virtual machines 112 coupled to the network 100. The VM manager module 132 coordinates with the VM location module 504 and virtual network profile module 500 to assign virtual machine profiles 116 to virtual machines, e.g. when virtual machines 112 move or are newly provisioned. The VM manager module 132 may also coordinate with enterprise virtualization platforms supporting servers 110.

SAA manager module 502 receives the SAA notifications 130 from the SAA modules 120 in the edge network elements 104. SAA manager module 502 determines whether thresholds in SLA parameters have been breached for a virtual machine 112 and whether to request a move of a virtual machine 112 to another server 110 due to one or more breaches of SLA parameter thresholds.

Figure 6:
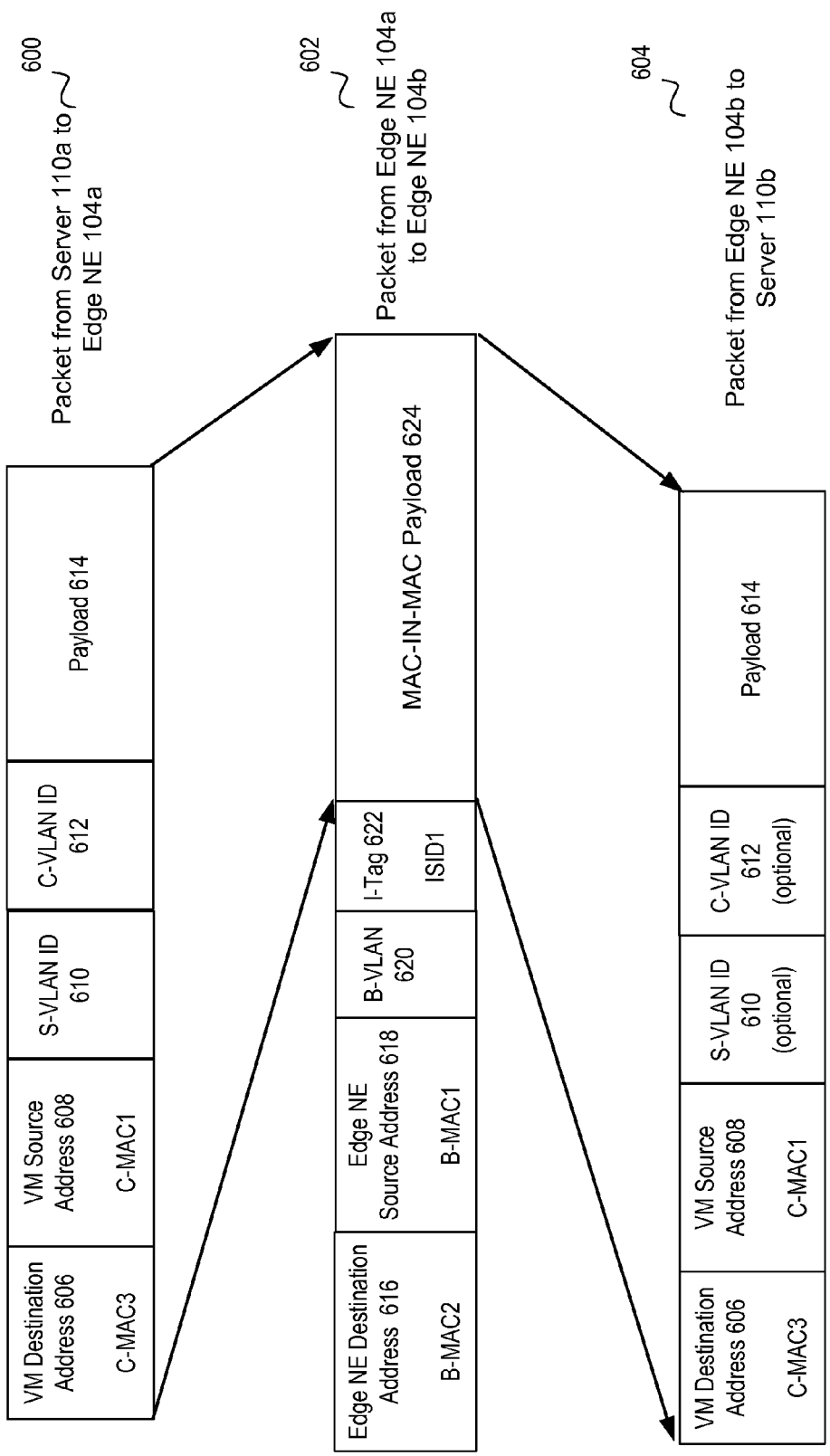
FIG. 6 illustrates a schematic block diagram of MAC-in-MAC packetization in a Shortest Path Bridging MAC protocol network.

FIG. 6 illustrates a schematic block diagram of MAC-in-MAC packetization in a Shortest Path Bridging MAC (SPB-M) protocol network. In an embodiment, network 100 is configured as an SPB-M type protocol network. SPB-M uses the Provider Backbone Bridge (PBB) network model to encapsulate customer packets (such as packets from servers 110) and tunnel the packets through the provider backbone network 102. The shortest path trees upon which the PBB network infrastructure operates are determined using a version of the Intermediate System-to-Intermediate System (IS-IS) link state protocol that supports TLV extensions for SPB (ISIS-SPB). Shortest Path Bridging MAC (SPB-M) is used to define sets of loop-free shortest path trees (SPTs) through the network 100. A network element in the provider network 100 serves as an SPT root for traffic entering that network element, thus allowing the network element to determine the shortest path to other network elements. The bridging methodology that allows a network element to serve as its own root is enforced through the use of SPB-M backbone VLANs (B-VLANs). The B-VLAN is a transport VLAN for SPB-M services and SPT calculations.

SPB-M encapsulation and tunneling services are configured on edge network elements 104 in the network 100 that originate or terminate a service, e.g. edge network elements 104 that are connected to host servers 110 or that connect to other networks where traffic will enter or leave the network 100. Layer 2 packets (such as unicast MAC frames) from a source server 110 to a destination server 110 are received at the SPBM edge network element 104. The layer 2 packets are encapsulated in a MAC-in-MAC packet with an IEEE 802.1ah Ethernet type header having source and destination MAC addresses corresponding to the source and destination edge network elements 104. The MAC-in-MAC packet traverses the network 100 until the packet reaches the destination edge network element 104. The MAC-in-MAC packet is then stripped of the encapsulation as the packet egresses the network to its destination server 110. An SPB-M protocol network has an advantage that devices in the provider backbone network 102 only need to learn MAC addresses of devices in the network 100 and not customer or client device MAC addresses, such as the MAC addresses of servers 110.

In the example embodiment in FIG. 6, packet 600 is transmitted from server 110a to edge network element 104a as shown in the example network 100 in FIG. 1. Packet 600 includes virtual machine (VM) destination address 606 and virtual machine (VM) source address 608. In this example, the VM destination address 606 is C-MAC3, the MAC address of VM3 112 in server 110b. The VM source address 608 is C-MAC1, the MAC address of VM1 112 n server 110a. Packet 600 may optionally include a service VLAN identifier (S-VLAN ID) 610 and/or customer VLAN identifier (C-VLAN ID) 612. Packet 600 further includes payload 614 and may include additional or alternative fields, such as type/length (TLV) field, frame check sequence (CRC) field, etc.

When packet 600 is received by edge network element 104a from server 110a (e.g., over a user to network interface (UNI) port), edge network element 110a encapsulates the packet 600 into MAC-in MAC payload 624 of packet 602. Packet 602 is transmitted over the provider network 100 to the destination edge network element 104. Edge network element 110a determines the edge network element (NE) destination address 616 from a customer MAC address table that maps MAC addresses of edge network elements 104 with their associated virtual machine MAC addresses.

The edge network elements 104 are operable to populate a customer MAC address table by learning the MAC addresses from incoming packets. Since the edge network elements 104 encapsulate and also strip the provider network layer 2 headers from customer packets, the customer MAC addresses are visible to the edge network elements 104. Learning is thus implemented at the edge network elements 104 to determine the C-MAC to B-MAC address relationship. Example customer MAC address tables stored in network elements 104 in the example of FIG. 1 are illustrated below in Table 1.

TABLE 1

| C-MAC | B-MAC | ISID | B-VLAN |
|---|---|---|---|
| Edge NE 104a | | | |
| C-MAC3 | B-MAC2 | ISID1 | B-VLAN1 |
| C-MAC4 | B-MAC3 | ISID1 | B-VLAN1 |
| C-MAC5 | B-MAC3 | ISID2 | B-VLAN2 |
| Edge NE 104b | | | |
| C-MAC1 | B-MAC1 | ISID1 | B-VLAN1 |
| C-MAC2 | B-MAC1 | ISID1 | B-VLAN1 |
| C-MAC4 | B-MAC3 | ISID1 | B-VLAN1 |
| C-MAC5 | B-MAC3 | ISID2 | B-VLAN2 |
| Edge NE 104c | | | |
| C-MAC1 | B-MAC1 | ISID1 | B-VLAN1 |

TABLE 1-continued

| C-MAC | B-MAC | ISID | B-VLAN |
|---|---|---|---|
| C-MAC2 | B-MAC1 | ISID1 | B-VLAN1 |
| C-MAC3 | B-MAC2 | ISID1 | B-VLAN1 |

The customer MAC address tables include the ISID 118 associated with the destination virtual machine 112. As new virtual machines 112 are moved or provisioned, an IS-IS protocol or similar routing protocol advertises the ISID 118 membership changes. The MAC address table may also include a provider network VLAN identifier (B-VLAN) defined for the ISID 118.

The edge network element 104a receives packet 600 and determines the MAC address B-MAC2 of the destination edge network element 104b using the customer MAC address table and the VM destination address C-MAC3. The edge network element 104a encapsulates packet 600 in MAC-in-MAC payload 624 of packet 602. The edge network element 104a inserts the MAC address of the destination edge network element 104b in edge NE destination address field 616. The edge NE source address field 618 includes the MAC address B-MAC1 of source edge network element 104a. I-Tag field 622 includes the service instance identifier ISID1 118. In addition, packet 602 may include a provider network VLAN (B-VLAN) identifier 620. Edge network element 104a then transmits packet 602 through the provider backbone network 102 to destination edge network element 104b.

Destination edge network element 104b receives packet 602 and retrieves packet 604 from the MAC-in-MAC payload and strips packet 604 of its layer 2 network header. Destination edge network element 104b then determines one or more port interfaces 114 (e.g., UNI ports) coupled to a server 110b associated with the VM destination address 606 and transmits packet 604 to the server 110b.

Figure 7:
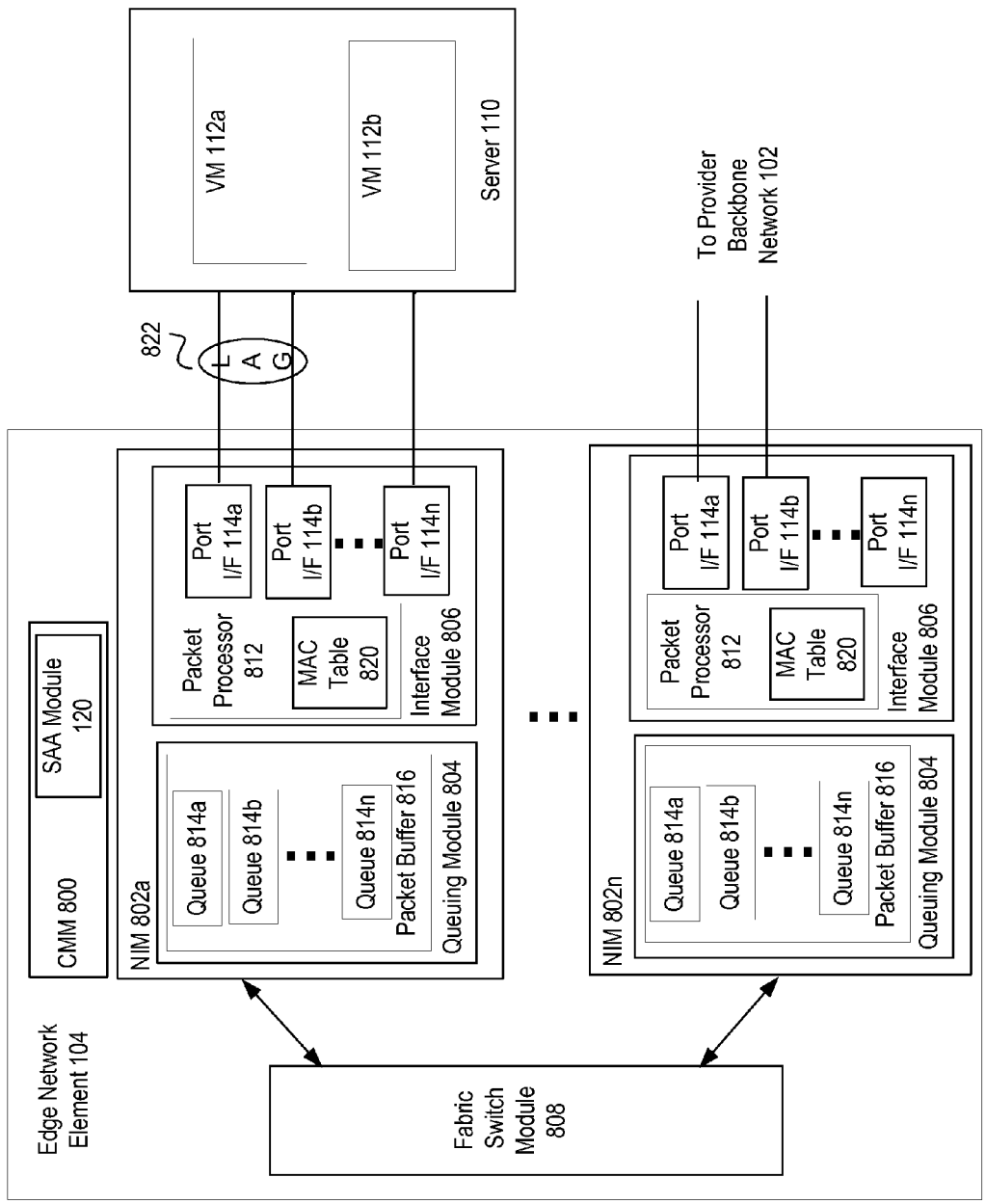
FIG. 7 illustrates a schematic block diagram of an embodiment of an edge network element.

FIG. 7 illustrates a schematic block diagram of an embodiment of edge network element 104. The edge network element 104 includes one or more Network Interface Modules 802a-n (NIMs), such as line cards or port modules, connected by a fabric switch module 808. A NIM 802 includes an interface module 806 and queuing module 804. For example, the NIMs 802a-n may include Ethernet (VLL, VPLS), IP/MPLS (IP VPN), legacy (ATM, SONET/SDH, POS), and/or other types of connections or services. An interface module 806 includes a plurality of port interfaces 114a-n with similar or varying port speeds, connector types and features. Interface module 806 also includes a packet processor module 812 that includes a MAC table database 820. The MAC table database 820 includes for example, a customer MAC address table illustrated in Table 1 as well as local port I/F 114 to MAC address mappings, B-VLAN, ISID 118 and other types of packet routing tables.

In an embodiment, packet processor 812 performs the MAC-in-MAC packetization to encapsulate a packet 600 from server 110 into an encapsulated MAC-in-MAC packet 602 transmitted to provider backbone network 102. In addition, packet processor 812 is operable to retrieve a packet 604 with a destination VM address associated with server 110 from a MAC-in-MAC payload and strip packet 602 of its layer 2 network header. Packet processor 812 then determines one or more port interfaces 114a, 114b and 114c (e.g., UNI ports) coupled to server 110 associated with the VM destination address 606 and transmits packet 604 to the server 110. An example of a local virtual machine to port addressing table for edge network element 104 in FIG. 7 is illustrated below in Table 2.

TABLE 2

| Edge NE 104 | | |
|---|---|---|
| NIM | Port ID | VM |
| 802a | 114a | C-MAC1 |
| 802a | 114a | C-MAC1 |
| 802a | 114n | C-MAC2 |

For example, the local virtual machine to port addressing table is included in MAC table 820 of packet processor 812.

Edge network element 104 also includes at least one primary control management module 800 (CMM) and may also include a secondary CMM (not shown) that acts as a back-up or redundant module in case of failure of the primary CMM 800. The CMM 800 provides automatic monitoring of the edge network element 104 including error detection and status information, such as hardware and software status, link integrity, data flow, etc. The CMM 800 also provides one or more device interfaces, such as a console, USB and/or Ethernet management port connection to the edge network element 104 for configuration and management of the network device by a network manager. CMM 800 also includes SAA module 120 through the functions of SAA module 120 may also be included and distributed in the NIMs 820*a*-*n*.

In an embodiment, edge network element 104 in the example shown in FIG. 7 is operably coupled to server 110 over one or more port interfaces 114*a*-*n* of NIM 802*a*. In an embodiment, a link aggregation group 822 of port interfaces 114*a* and 114*b* of NIM 802*a* is coupled to the server 110 as well as port interface 114*n* of NIM 802*a*. The port interfaces 114*a*, 114*b* and 114*n* of NIM 802*a* coupling the server 110 to network element 104 may be configured as user to network interface (UNI) ports including virtual network profile 116 configurations as described herein. In addition, port interfaces 114*a* and 114*b* of NIM 802*n* are operably coupled to one or more devices in the provider backbone network 102.

FIG. 8 illustrates a logical flow diagram of an embodiment of a method of operation 800 of an edge network element 104. In step 802, edge network element 104 determines one or more service level parameters mapped to a local virtual machine, e.g. from the SLA definition 512 in vNP 116. In step 804, edge network element 104 generates at least one probe to measure the one or more service level parameters over a network path to a remote edge network element 104 associated with a remote virtual machine 112. In an embodiment, the probe is defined by SAA probe definition 514 in vNP 166. In an embodiment, the remote virtual machine has a same service instance identifier ISID 118 or vNP 116. In another embodiment, edge network element 104 generates for each local virtual machine 112, an SAA probe 122 to measure one or more service level parameters of the network path between the edge network element 104 and each remote edge network element 104 with an associated remote virtual machine 112 having a same ISID and/or same vNP.

In step 806, edge network element 104 generates an SAA notification 130 to a network management system 106, wherein the SAA notification 130 includes the measured one or more service level parameters of the network path and media access control (MAC) addresses of the edge network element 104 and the remote edge network element 104 associated with the remote virtual machine 112. In an embodiment, SAA notification 130 may include a history of the SAA probes 122 for a specified period of time or number of iterations. Alternatively or in addition thereto, the SAA notification 130 may include a notice that one or more service level parameters in one or more iterations of one or more SAA probes 122 breaches a predetermined threshold. In addition, the SAA notification may also include the MAC address of the local virtual machine 112 and remote virtual machine 112 and an identifier of the shared ISID 118 of the local virtual machine 112 and remote virtual machine 112.

FIG. 9 illustrates a logical flow diagram of an embodiment of a method of operation 900 of VM manager module 132 of network management system 106. The VM manager module 132 receives and processes an SAA notification 130 in step 902 from a local edge network element 104. In an embodiment, the SAA notification 130 includes one or more measured service level parameters of a network path between a local virtual machine 112 associated with the local edge network element 104 and a remote virtual machine 112 associated with a remote edge network element 104. In an embodiment, the local virtual machine and the remote virtual machine are configured with a same ISID 118 and/or vNP 116. In step 904, VM manager module 132 determines whether one or more measured service level parameters in the SAA notification 130 breach one or more thresholds in the SLA definition 514 assigned in the vNP 116 to the local and remote virtual machines. When thresholds have been breached, VM manager module 132 may determine to move the remote virtual machine 112 to an alternative path. In step 906, VM manager module 132 determines an alternative path including another remote edge network element 104, wherein the alternative network path meets the thresholds in the SLA definition assigned to the remote virtual machine 112. In step 908, VM manager module 132 moves the remote virtual machine 112 to be associated the another remote edge network element 104 in the alternative path. For example, VM manager module 132 moves the remote virtual machine 112 to a server 110 coupled to the another remote edge network element 104.

VM manager module 132 thus has the ability to monitor SLA parameters between virtual machines 112 in a network, such as a SPB-M network. VM manager module 132 receives an SAA notification 130 that associates the SLA parameters with the MAC addresses of the virtual machines 112 and the edge network elements 104 associated with the virtual machines 112. VM manager module 132 is thus able to receive the C-MAC addresses of the virtual machines 112 for an ISID 118 mapped to the SAA probes and measured SLA parameters. This mapping helps the VM manager module 132 to determine SLA parameters are met for ISID services between virtual machines 112 and move virtual machines 112 when SLA parameter thresholds are breached or otherwise not met.

The term "module" is used in the description of one or more of the embodiments of elements herein. A module includes a processing device and/or a non-transitory memory that stores operational instructions for performing one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules. A processing device includes a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The various modules may include a memory that is an internal memory or an external memory, and the memory may be a single memory device or a plurality of memory devices. The memory may be a read-only memory, random access memory, volatile memory, non-volatile memory, static memory, dynamic memory, flash memory, cache memory, and/or any device that stores digital information. The various modules may implement one or more of its functions via a state machine, analog circuitry, digital circuitry, and/or logic circuitry. The memory storing the corresponding operational instructions may be embedded within, or external to, the circuitry comprising the state machine, analog circuitry, digital circuitry, and/or logic circuitry. The various modules may execute hard-coded and/or software and/or operational instructions stored by the memory to perform the steps and/or functions described herein.

As may be used herein, the term "operable to" indicates that an element includes one or more of modules, data, input (s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A network element, comprising:
   a service assurance agent (SAA) module operable to:
      determine a service level agreement (SLA) definition mapped to a local virtual machine associated with the network element, wherein the SLA definition includes one or more service level parameters;
      generate a probe to measure the one or more service level parameters of a network path between the network element and a remote network element associated with a remote virtual machine; and
      generate an SAA notification to a network management system, wherein the SAA notification includes the measured one or more service level parameters of the network path and addresses of the local virtual machine associated with the network element and the remote virtual machine.

2. The network element of claim 1, wherein the SLA definition mapped to the local virtual machine is included in a virtual network profile associated with the local virtual machine.

3. The network element of claim 2, wherein the virtual network profile is associated with a type of service, wherein the type of service is identified using a service instance identifier (ISID).

4. The network element of claim 3, wherein the SAA module operable to generate the probe to measure the one or more service level parameters of the network path between the network element and the remote network element associated with the remote virtual machine, wherein the remote virtual machine is configured with a same ISID as the local virtual machine.

5. The network element of claim 4, wherein the network element is further operable to:
   map a MAC address of the remote virtual machine to a MAC addresses of the remote network element; and
   populate a MAC address table with the MAC addresses of the remote virtual machine to the MAC address of the remote network element.

6. The network element of claim 5, wherein the SAA module is further operable to:
   determine the remote network element associated with the remote virtual machine having a same ISID as the local virtual machine using the MAC address table.

7. The network element of claim 6, further comprising:
   a packet processor module operable to:
      receive a first packet from the local virtual machine with a destination MAC address of the remote virtual machine;
      determine the MAC address of the remote network element associated with the remote virtual machine using the MAC address table; and
      encapsulate the first packet in a second packet with a destination address of the remote network element associated with the remote virtual machine.

8. The network element of claim 5, wherein the SAA notification includes the MAC address of the remote network element associated with the remote virtual machine.

9. The network element of claim 8, wherein the SAA module is further operable to:
   determine one or more thresholds of the one or more service level parameters in the SLA definition for the local virtual machine are breached; and
   generate the SAA notification to the network management system, wherein the SAA notification further includes the one or more breached thresholds.

10. The network element of claim 8, wherein the SAA module is further operable to:
    store a predetermined number of iterations of the SAA probe, including the measured service level parameters from the predetermined number of iterations of the SAA probe; and
    transmit the measured service level parameters from the predetermined number of iterations of the SAA probe in the SAA notification to the network management system.

11. The network element of claim 1, wherein the local virtual machine is included in a server coupled to the network element, wherein the network element is a local edge network element of a provider network.

12. The network element of claim 10, wherein the network path between the local virtual machine and the remote virtual machine includes the local edge network element, one or more devices in a provider backbone network and the remote network element associated with the remote virtual machine.

13. A network management system, operable to:
receive an SAA notification, wherein the SAA notification includes one or more measured service level parameters of a network path between a local edge network element associated with a local virtual machine and a remote edge network element associated with a remote virtual machine;
determine the one or more measured service level parameters breach one or more thresholds in a service level agreement (SLA) definition assigned to the remote virtual machine;
determine an alternative network path including another remote edge network element, wherein the alternative network path meets the thresholds in the SLA definition assigned to the remote virtual machine; and
move the remote virtual machine to be associated the another remote edge network element.

14. The network management system of claim 13, further operable to:
receive another SAA notification, wherein the another SAA notification includes one or more measured service level parameters of the alternative network path between the local edge network element associated with the local virtual machine and the another remote edge network element associated with another remote virtual machine; and
determine the alternative network path meets the thresholds in the SLA definition assigned to the another remote virtual machine.

15. The network management system of claim 13, wherein the SAA notification includes a media access control (MAC) address for the local edge network element, a MAC address for the local virtual machine, a MAC address for the remote edge network element and the MAC address for the remote virtual machine.

16. The network management system of claim 13, wherein the SAA notification includes a service instance identifier (ISID) and wherein the remote virtual machine and the local virtual machine are assigned to the ISID.

17. A method, comprising:
determining a service level agreement (SLA) definition mapped to a local virtual machine associated with a local network device and to a remote virtual machine associated with a remote network element, wherein the SLA definition includes one or more service level parameters;
generating a probe to measure the one or more service level parameters of a network path between the network element and the remote network element; and
generating an SAA notification to a network management system, wherein the SAA notification includes the measured one or more service level parameters of the network path and a MAC address of the local virtual machine and the MAC address of the remote virtual machine.

18. The method of claim 17, further comprising:
determining the local virtual machine and the remote virtual machine are assigned to a same virtual machine profile, wherein the virtual machine profile includes the SLA definition.

19. The method of claim 17, further comprising:
determining the local virtual machine and the remote virtual machine are configured with a same service instance identifier.

20. The method of claim 17, further comprising:
mapping the MAC address of the remote virtual machine to a MAC addresses of the remote network element; and
populating a MAC address table with the MAC addresses of the remote virtual machine to the MAC address of the remote network element.

* * * * *